United States Patent [19]

Hagemayer et al.

[11] Patent Number: 4,778,989

[45] Date of Patent: Oct. 18, 1988

[54] SCANNING DEVICE FOR MICROLINE-BY-MICROLINE ILLUMINATION AND OPTICALLY SCANNING A PLANAR ORIGINAL

[75] Inventors: Friedrich Hagemayer; Hartmut Grethen; Peter Hamann; Wolfgang Meye, all of Berlin, Fed. Rep. of Germany

[73] Assignee: Siemens Aktiengesellschaft, Berlin and Munich, Fed. Rep. of Germany

[21] Appl. No.: 774,362

[22] Filed: Sep. 10, 1985

[30] Foreign Application Priority Data

Sep. 19, 1984 [DE] Fed. Rep. of Germany ....... 3434806
Mar. 29, 1985 [DE] Fed. Rep. of Germany ....... 3512098
May 24, 1985 [DE] Fed. Rep. of Germany ....... 3519263

[51] Int. Cl.⁴ .............................. H01J 5/16; G02B 6/14
[52] U.S. Cl. .................................... 250/227; 350/96.1
[58] Field of Search ............... 250/227, 211 J, 578; 350/96.1; 357/30–32; 358/200, 213, 256, 293

[56] References Cited

U.S. PATENT DOCUMENTS 4,634,857 1/1987 Fey ...................................... 250/578

Primary Examiner—David C. Nelms
Assistant Examiner—Stephone B. Allen

[57] ABSTRACT

An apparatus for microline-by-microline illumination and scanning of a planar original has a number of spaced illumination elements, each having longitudinal and transverse dimensions substantially corresponding to a microline, and a number of spaced light-receiving elements disposed perpendicularly with respect to the microlines and corresponding to the number of desired picture elements along a microline to be scanned. Each light-receiving element at least partially overlaps a microline. The illumination elements and the light-receiving elements are respectively disposed in parallel planes in a common film. Structure is also provided at each overlap of a light-receiving element with a microline for coupling light from an illuminated microline to the light-receiving element.

44 Claims, 5 Drawing Sheets

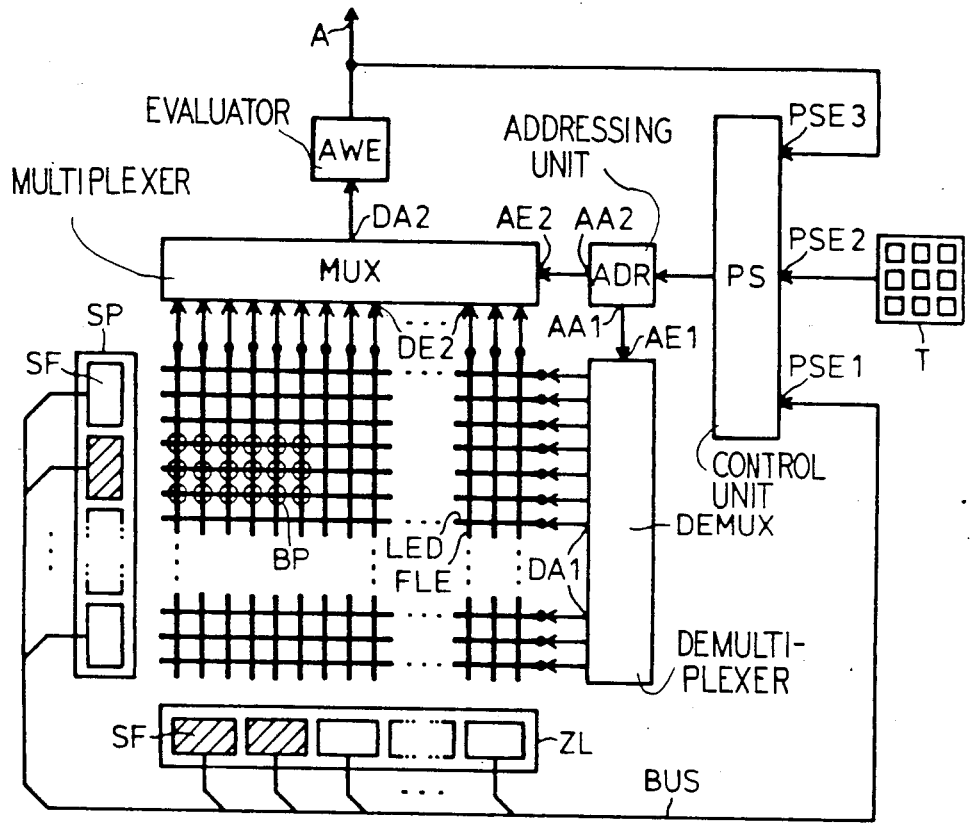
FIG 10
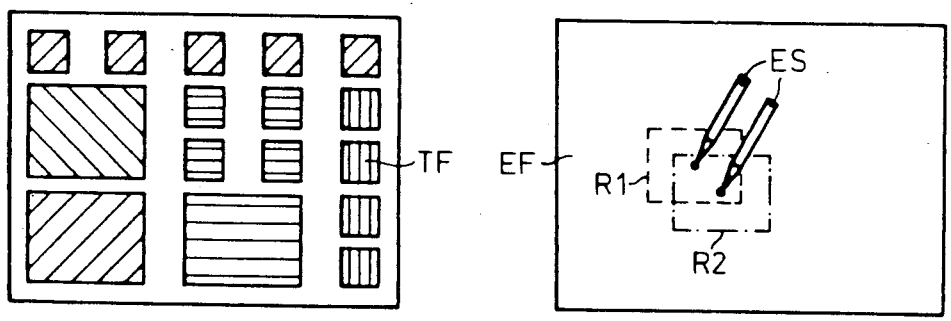
FIG 11
FIG 12

SCANNING DEVICE FOR MICROLINE-BY-MICROLINE ILLUMINATION AND OPTICALLY SCANNING A PLANAR ORIGINAL

The present invention relates to devices for simultaneously illuminating and optically scanning a planar original, and in particular to such a device which employs an illumination means and the scanning means in a single planar film.

DESCRIPTION OF THE PRIOR ART

Various types of devices for generating an image information corresponding to an original and for optical, electronic or magnetic storage of these image information are known. All known scanning devices of this type make use of relative motion between the scanning device and the planar original during the scanning operation. This relative motion can be realized by a movement of the original or by advancement of a light pick-up device receiving the light reflected from the original and/or of an illumination system. It is further known to place a light guide device on the planar original and to conduct the illumination system and the light pick-up device along a surface of the light guide device facing away from the planar original.

SUMMARY OF THE INVENTION

It is an object of the present invention to provide a scanning device for microline-by-microline illumination and optical scanning of a planar original having a light pick-up device receiving the light reflected from the original which has a plurality of parallel light-receiving elements aligned perpendicular to the microlines which correspond in number to the number of image points to be scanned along a microline without a relative motion between parts of the scanning device and the planar original, The above object is achieved by microline-associated illumination elements with longitudinal and transverse dimensions which at least approximately correspond to the dimensions of the microlines arranged within a film or foil which accepts the light-receiving elements in a plane parallel to the plane of the illumination elements, these light-receiving elements being designed and/or controlled such that light from a microline can be coupled into the light-receiving elements at every crossing point with an illuminated microline.

The scanning device of the invention is thus completely concentrated within a film or foil which essentially contains illumination elements oriented line-wise and light-receiving elements oriented column-wise. The film or foil is preferably transparent, so that the illumination elements can be arranged closer to the original than the light-receiving elements, both for light conduction from the illumination elements to the original and from the original to the light-receiving elements. Light reflected from the original in the regions between neighboring illumination elements can proceed through the transparent film or foil to the light-receiving elements.

For the realization of the illumination elements providing light conduction along each and every microline, a number of embodiments are disclosed. Thus, for example, the illumination elements can be formed by light-conducting channels in whose end faces the light of a light source can be coupled in and which are designed and/or controllable, at least in the region of every picture element along a microline, such that light emerges from light exit regions of the channel walls.

The light-conducting channels can, for example, be realized by conventional optical fibres arranged in or on the film parallel to one another. It is also within the concepts disclosed herein to realize the light-conducting channels by rigid fibre rods or light-conducting rods fashioned in the film. An illumination unit for the original which is particularly simple to manufacture, is achieved using light-conducting rods fashioned in the transparent film in the form of ridge-like elevations, so that the film exhibits a rippled surface.

In a further embodiment of the scanning device of the invention which in addition to simple manufacture also guarantees particularly precise light-conduction, the light-conducting rods are embedded in the film and are surrounded by the film on three sides. The film is preferably composed of a material having a lower optical refractive index than that of the light-conducting rods, so that the light conducted in the light-conducting rods experiences a total internal reflection in the boundary region between the light-conducting rods and the film, whereby stray light influences between respectively neighboring light-conducting rods are prevented. A reduction of stray light influences can also be achieved by mirroring the film at least in those regions surrounding the light-conducting rods. A simple assembly of the light-conducting rods in the film while still maintaining microline-precise light conduction in the light-conducting rods can be achieved wherein the light-conducting rods are composed of transparent filler material for grooves impressed in the film. The grooves may be impressed or scored in the film with high precision in a preceding method step. The film may alternatively be composed of a casting material for the light-conducting rods. A general prerequisite for decoupling light from the light-conducting channels which can be exploited in practice is that these light-conducting channels be composed of a crystalline material.

Further developments of the invention relate to the problem of influencing the energy balance of the light conducted in the line direction within the light-conducting channels. The radiance of the light coupled in at an end face of the light-conducting channels exponentially decreases along the light-conducting channels. This decrease opposing a uniform illumination of the microlines can be at least partially compensated by increasing the transparency of the exit regions of the light-conducting channels along the channels from the end of the light-conducting channels closer to the light source. Instead of or in combination with this measure, the cross-section of the exit regions can also be increased along the light-conducting channels from the end of the light-conducting channels closer to the light source. A further measure for reducing the decrease in the radiance of the light within the light-conducting channels is that of mirroring the light-conducting channels at their ends facing away from the light source. Insofar as light can be coupled into both end faces of the light-conducting channels simultaneously, which is provided in a further development of the invention, the transparency and/or the cross-section of the exit regions can steadily increase from the ends of the light-conducting channels toward the center thereof. Improvement in the uniform distribution of the intensity of illumination along a microline is also promoted by forming every illumination element of two parallel light-conducting channels which are immediately adjacent to one another, one end region of one of the channels having a mirror means allocated to it which deflects the light emerging from that channel into the other light-conducting channel. A partial compensation of the exponentially decreasing intensity of illumination on the illuminated original along the microline ensures by means of the oppositely directed exponential decreases of the radiance along the two light-conducting channels.

All measures for the partial compensation of the exponential modification of the radiance along the light-conducting channels can be augmented by measures in the region of the light-receiving elements or of the signal evaluation.

Another embodiment of the invention has micro-point-associated exit regions along the light-conducting channels and the light-conducting channels have notches at their sides facing away from the original. The notches are in the region of every picture element along a microline and are aligned transversely relative to the longitudinal direction of the light-conducting channel. The notch faces facing the light source are inclined at an angle of at least approximately 45° relative to the axis of the light-conducting channel. The light rays are reflected at the notch faces facing the light source so as to be incident on the channel wall in the light exit region of the light-conducting channel roughly perpendicularly, and can thus emerge from this region. Compensation of the exponentially decreasing radiance along the light-conducting channels can be achieved by increasing the notch depth along the light-conducting channels from that end of the light-conducting channels facing the light source. Accordingly, only a relatively slight part of the light is reflected at the front notch faces facing the light source; the greater part, by contrast, is conducted within the light-conducting channels. These conditions are reversed in the end region of the light-conducting channels.

In a further development of the scanning device of the invention, a microline-by-microline decoupling of the light from the light-conducting channels is achieved by providing an optical diffraction grating at the sides of the channels facing away from the original. The light conducted in the light-conducting channels is beamed out onto the original in a diffraction pattern at every grating point when it is incident on the diffraction grating, so that the total diffraction patterns add to a uniform illumination of the associated microline. Disadvantageous interference phenomena can thereby be avoided by employing light sources having polychromatic and non-coherent light. The optical diffraction grating can be scored or etched into the walls of the light-conducting channels. Uniform illumination of the diffraction gratings by the light laterally coupled into the light-conducting channels can be achieved, for example, by decreasing the thickness of the light-conducting channels between their sides facing the original and their sides facing away from the original along the channels from that end of the channels proximate to the light source.

Given the use of a conventional flourescent lamp having a luminous flux of 1000 lm and an approximately uniform distribution of the light on approximately 2000 picture elements, i.e., exit regions along the light-conducting channels, an intensity of illumination of approximately 5 lux can be achieved on a microline.

For enhancing or retaining this intensity of illumination despite smaller light sources having lower luminous flux, the simultaneous light decoupling from all exit regions of a light-conducting channel can be omitted and instead controlled decoupling of light from individual exit regions can be undertaken which is active point-by-point or by point groups. This is preferably achieved by successively activating the exit regions of every light-conducting channel by local cancellation of the total internal reflection which progresses along each light-conducting channel. This active control of the decoupling from the exit regions of the light-conducting channels can, for example, be realized by sound waves, whereby the number of exit regions simultaneously activated is dependent on the shape of the sound wave. Given generation of a sound wave tone having a pulse width of about 25 ns duration, only one exit region of the excited light-conducting channels is activated. In order to exploit this acousto-optical effect, the light-conducting channels are excited pulse-wise in the region of their end faces by means of a sound generator. When the exit regions of the light-conducting channels are defined by notches in the light-conducting channels in the fashion already described, the region between the two notch faces of every notch is filled with a material having a slightly higher optical refractive index than that of the respective light-conducting channels. A light decoupling due to total internal reflection at a notch only occurs in this case when the refractive index of the material filling out the notch is, for example, modified by a sound wave tone to a value below that of the material of the light-conducting channels. Local cancellation of the total internal reflection in the region of the exit regions of the light-conducting channels can be similarly achieved by means of a known electro-optical effect (Pockels effect). To this end, the light-conducting channels are equipped with electrode surfaces either individually or in common.

Known acousto-optical or electro-optical methods of coupling light out from light-conducting channels can, however, also be exploited given simultaneous decoupling from all exit regions of a light-conducting channel, the methods being used to generate a microline-by-microline illumination of the original which progresses from light channel to light channel. Accordingly all exit regions of a light-conducting channel are simultaneously activatable by local cancellation of the total internal reflection which corresponds to the length of the light-conducting channels and which is progressive from light-conducting channel to light-conducting channel. Given exploitation of the acousto-optical effect, the film can be excited in the region of one of its end faces parallel to the light-conducting channel by a sound generator. This line-long decoupling of light which progresses from microline to microline offers the advantage that all light-conducting channels can be simultaneously supplied with light, so that auxiliary devices for light control in the region of the end faces of the light-conducting channels can be eliminated.

If line-long out-coupling of light from illuminated light-conducting channels which progresses from light-conducting channel to light-conducting channel is not used, or no point-wise decoupling of light along only a single light-conducting channel is undertaken, control of the light feed from the light source to the individual light-conducting channels must be provided. This, for example, can be achieved by connecting the light source to the input of a light gate chain with individually switchable light-conducting channel-associated outputs. Control of the light passage to the end faces of the individual light-conducting channels is accomplished by using known electro-optical or magneto-optical effects. The light gate chain, however, can also be formed by at least one light conductor whose exit regions opposite the end faces of the light-conducting channels are activatable by local cancellation of the total internal reflection which successively progresses along the light conductor. The function of the light gate chain is thus the same as the function of the light decoupling from the light-conducting channels, so that it is preferable to design the light gate chain such that the format and activation of the light conductor is identical to that of the light-conducting channels.

In view of the space requirements for the light source and, in particular, the desired incorporation of possibly all auxiliary components which are required into the film or into a structural unit whose thickness does not exceed the thickness of the film, it is preferable that the light source is realized by a LED line or array. A controllable light gate chain can be entirely omitted when the LED line or array comprises a plurality of individually switchable LED cells which corresponds in number to the number of light-conducting channels.

Within the framework of the invention, however, illumination elements are also possible which replace a central light source or light sources allocated to the end faces of the light-conducting channels by light sources which also assume the light distribution along the microlines in addition to generating light. In this context, a further embodiment of the invention has illumination elements formed by individually switchable electro-luminescent lines of an electro-luminescent display. Intensities of illumination of about 20 lux along a microline can thereby be achieved without difficulty with commercially available electro-luminescent displays. A microline-by-microline illumination of the original to be scanned can be achieved in a further embodiment wherein in that the illumination elements are formed by individually controllable light gate lines which can be illuminated at their side facing away from the original. In this embodiment of the scanning device of the invention, the use of specific light sources can be omitted and, instead, illumination of the original can ensue by ambient light in a simple way. Microline-by-microline illumination ensues by controlling the transparency of the individual light gate lines. Uniform illumination of the microlines can be achieved given spatially unbalanced ambient light, under given conditions, by placing a partially transparent film (milk glass wafer) on the scanning device. Liquid crystal lines or arrays are available for realizing the controllable light gate lines, the response inertia of these liquid crystal lines having a less deleterious effect in that the switching time between the turn-on and turn-off of a liquid crystal line corresponds to the time required for scanning a microline and is thus adequately long.

The intensity of illumination of the microlines in the region of each and every individual picture element and security against unwanted light can be improved by placing a strip-shaped lens between every illumination element and the original. The partially cylindrical lenses are preferably fashioned at that surface of the transparent film facing the original. Such films (ripple plates) can be fabricated with relatively little outlay. When the individual illumination elements are disposed closer to the original than the light-receiving elements, the partially cylindrcal lenses are fashioned (for example approximately hemispherically cylindrically) such that the light reflected from the original enters into a corresponding entrance region of the associated light-receiving elements through the transparent film in the region between two illumination elements.

A number of embodiments are also disclosed within the framework of the invention for the light-receiving elements, just as for the illumination elements. For example, the light-receiving elements may be light guides designed and/or controlled, at least in their region facing the original, such that the light reflected from the original enters into the light guides. The light guides thus have a similar structure and function as the light-conducting channels serving as illumination elements. Accordingly, control of the light guides can also be undertaken in a manner similar to that of the light-conducting channels, whereby matching to one another is only necessary insofar as it must be assured that only the light of a single picture element of the original is evaluated at a specific point in time by means of a light guide. Accordingly, the entry regions of each light guide are successively activatable by local cancellation of the total internal reflection which progresses along said light guide. By using the acousto-optical effect, this can be achieved by exciting the light guides pulse-wise in the region of their end faces by a sound generator. Depending upon the wave shape, only a single exit region or a group of exit regions is activated at one time. Such a group-by-group or point-by-point activation of entry regions of the light guides is particularly useful in combination with such a frdohm and control of the illumination elements which provide simultaneous illumination of all picture elements along a microline. However, it is also possible that all entry regions of a light guide be simultaneously activatable by local cancellation of the total internal reflection which progresses from light guide to light guide. The known acousto-optical effect can thereby be realized by exciting the film with a sound generator in the region of one of its end faces parallel to the light guides. Simultaneous cancellation of the total internal reflection extending over the entire length of a light guide can also be exploited given a corresponding design of the light-conducting channels serving as illumination elements to cancel the total internal reflection along the individual light-conducting channels which progresses synchronously therewith. Given illumination of only a single light-conducting channel, the light of all picture elements along the microline allocated to the illuminated light-conducting channel is successively introduced with the progressive sound wave into the respectively allocated and simultaneously activated light guide.

The light guides conduct the light to a light evaluation means, whereby a light sensor is preferably allocated to one of the two end face regions of the light guides. The other end face plane is preferably mirrored. The light sensor is preferably combined with the film to form a structural unit; this promotes a design of the overall scanning device as a flat desk-top system. Preferably, every light guide has a respective light sensor element allocated to it, so that precise scanning of the individual picture elements is established given simultaneous illumination of all picture elements of a microline, differing from successive illumination which, for example, can be triggered by a sound wave tone migrating along the illumination element.

Similar to the illumination elements, which can be fashioned both as light-conducting channels conducting the light generated by a light-source to the individual picture elements or as electro-luminescent lines which immediately generate the light, realization of the light-receiving elements is also possible by light guides conducting light to an evaluation device or by elements which directly evaluate the received light. In this context, a further embodiment of the invention provides that the light-receiving elements are photo-conductor strips. Particularly good acquisition of the light reflected from the illuminated picture elements is thereby achieved if the photo-conductor strips are disposed closer to the original than the illumination elements. The photo-conductor strips may each comprise a plurality of photo-conductor elements which are applied to a common transparent film electrode in the longitudinal direction of the photo-conductor strip, being applied thereto in respective microline-associated intervals, and the photo-conductor elements are connected to one another by a comb-shaped light-impermeable cover electrode. Given a voltage applied to the electrodes, a photo-current proportional to the light incident on the photo-conductor elements flows, whereby a charge quantity corresponding to the photo-current can be generated (due to the previously charged strip capacitance) or the respective photo-current can be measured. The capacitance of the photo-conductor strips is kept low by the sub-division into the microline-associated photo-conductor elements. Manufacture of the photo-conductor strips can be simplified without significantly influencing their capacitance wherein the photo-conductor elements of all photo-conductor strips respectively situated along a microline are composed of a single, line-shaped element, and wherein the respective line-shaped element is covered in a light-impermeable fashion in the regions between two neighboring cover electrodes.

The scan time required for scanning an original is shortened as more picture elements of the original are simultaneously scanned, i.e., scanned optically parallel. Together with the number of picture elements to be simultaneously scanned, however, the number of bits which must be simultaneously processed in parallel and, accordingly, the required circuit outlay also rises. A further embodiment of the scan device of the invention which enables considerable reduction in the scan time for scanning an original, given only a slightly higher manufacturing outlay, divides every photo-conductor strip into at least two sub-strips placed following one another in the longitudinal direction of the photo-conductor strip, and illumination elements corresponding in number to the number of sub-strips, and which respectively cross different sub-strips of a photo-conductor strip, are simultaneously selectable. Thus, a plurality of microlines are simultaneously illuminated, whereby the intensities of illumination of the picture elements of different, illuminated microlines are simultaneously detected by different sub-strips of the photo-conuctor and are subsequently evaluated. All that is still required for a scanning of the entire original is that the microlines which respectively cross a sub-strip of the photo-conductor strip be successively scanned, so that the scan time is shortened in proportion to the number of sub-strips per photo-conductor strip. A further reduction of the scan time derives from the reduction of the strip capacitance of the photoconductor strip by dividing this into sub-strips. The charge difference or, respectively, the photo-current of the substrips can then be simultaneously acquired by corresponding evaluation devices, whereby acceleration of the evaluation operation is achieved.

Alternatively to the embodiment of the scan device of the invention described above or in combination therewith, an embodiment of the scan device is disclosed wherein the photo-conductor elements in the longitudinal direction of the photo-conductor have different cover electrodes alternately allocated to them, and the illumination elements respectively crossing photo-elements having different cover electrodes are simultaneously selectable.

In view of a versatile employment of the scan device, a further embodiment of the scan device of the invention provides that, for picture-element-by-picture-element scanning of the original, the illumination elements have a demultiplexer means with illumination-element-associated data outputs allocated to them, and the light-receiving elements are followed by a multiplexer means having light-receiving-element-associated data inputs and a data output at which electric scan signals corresponding to the scanned picture elements are available. The demultiplexer means and the multiplexer means have an addressing means allocated to them which is connected at an address output to an address input of the demultiplexer means and which is connected at a further address output to an address input of the multiplexer means. The addressing means is connected to a program control device at the input side. In this embodiment, every picture element of the original to be scanned can be individually scanned with relatively little circuit outlay at the crossing point of an illumination element with a light-receiving element. For example, the original may be scanned in a coarse or fine screen at a correspondingly fast or slow speed by selection of the picture elements to be scanned, this selection being calculated in the program control device. Via the addressing means, the address value of the respective illumination element and of the respective light-receiving element are thereby supplied to the demultiplexer means or to the multiplexer means for activation of the corresponding elements. The sample of the addressed picture element is thereby available at the data output of the multiplexer means for further evaluation. When the illumination elements are composed of light-conducting channels to which a light gate chain having individually switchable, light-conducting-channel-associated outputs or a LED line or array having individually switchable LED cells is allocated, the outputs of the light gate chain or of the individual LED cells are connected at the control side to the data outputs of the demultiplexer means. If, by contrast, the illumination elements are formed of individually switchable electro-luminescent lines or light gate lines, they can be directly connected to the corresponding data outputs of the demultiplexer means. In the case of the light-receiving elements, correspondingly, the light sensors or photo-conductor strips are connected to the data outputs of the multiplexer means depending upon the design of the light-receiving elements.

The data output of the multiplexer means can be followed by an evaluation device which is connected at the output side to a scan signal output of the scan device, and to an input of the program control device. In the evaluation device, the signal supplied by the multiplexer means is freed of disturbances and is converted into a signal form suitable for further digital processing.

To this end, the evaluation means contains filter circuits, analog-to-digital converters and threshold circuits in a fashion known from telecopier technology. The output-side connection of the evaluation means to an input of the program control device supplies the evaluated samples to the program control device together with their respective address values calculated by the program control device.

In view of the versatility of the scan device disclosed herein resulting from the above-specified, individual selection of the picture elements to be scanned, a further embodiment has contact-sensitive sensor fields situated in the edge region of the film along a column and along a row such that a plurality of illumination elements lying next to one another are respectively allocated to every sensor field along the column and a plurality of light-receiving elements lying side-by-side are allocated to every sensor field along the row. The contact-sensitive sensor fields are connected to data inputs of the program control device which calculates a starting address and an end address for activation of the data outputs of the demultiplexer means, or for activation of the data inputs of the multiplexer means. The addresses are calculated from the contacted sensor fields and from the number of illumination elements and light-receiving elements respectively allocated to them. A section-by-section scanning of the original is thereby achieved in a particularly simple and user-friendly way in that the section to be scanned is defined by selecting the contact-sensitive sensor fields along the column and along the row. Because the scan resolution remains the same regardless of the scan section selected, a reduction of the scan time results using such section-by-section scanning. The program control device calculates the start and end address for the control of the microline illumination by the demultiplexer means, calculating these addresses from the contacted sensor fields along the column. Similarly, the start and end addresses for the selection of the light-receiving elements by the multiplexer means are calculated from the contacted sensor fields along the row.

The scan device disclosed herein offers many uses, particularly in the area of office machine technology, which extend beyond the area of facsimile, copier or telecopier technology. For manual selection of memory locations of an electronic memory connected with the scan device, a keyboard foil is optically scanned as the original, this keyboard foil having marked key fields on its surface and at least partially transparent regions in the marked key fields. The covered key fields are localized in the program control device from the respective signal at the data output of the multiplexer means and from the address values pending at the address outputs of the addressing means. Selection of the memory locations allocated to the individual key fields ensues dependent on the address values of the localized key fields. In addition to the function of device disclosed herein as a scan device for originals, this embodiment enables an additional use of the scan device as a touch-sensitive input device for the control of, for example, other office machines. The keyboard foil is scanned by the scan device, whereby a short scan time can be achieved by a coarse scan resolution, for example by simultaneous illumination of a plurality of microlines. When the at least partially transparent region of a key field is covered, then, on the basis of the altered optical samples at this location, the program control device recognizes the address values of the covered key field and enables a program function allocated to the actuated key field to be worked off by access to a corresponding memory location in the memory defined by the identified address values.

In order to be able to allocate different key functions to the individual key fields when using different keyboard foils, the scan device preferably reads an identification mark applied to the keyboard foil. The scan signal generated by the scanning of the identification mark is compared in the program control device to stored identification words and, given coincidence between the scan signal and one of the identification words, program access to a program part allocated to the identification word is permitted. In this fashion, the program control device automatically allocates the associated program part to every keyboard foil put in place, said program part determining the memory locations allocated to the individual key fields with the keyboard functions stored therein.

In a further method for operating the scan device disclosed herein, an input foil is employed as the original for acquiring addresses characterizing the respective position of an input pin on the original, the reflectability of said input foil being locally variable via the input pin. The starting position of the input pin on the input foil is identified in the program control device by means of initial scanning of the entire input foil and, after the identification of the starting position of the input pin, the input foil is continuously scanned in a rectangular section around the position of the input pin, whereby the position of the scan section is re-calculated around the position after every scan of the rectangular section dependent on the respectively identified position of the input pin. With this method, the scan device can be employed as what is referred to as a digitizer for graphic input of curves. For identifying the momentary position of the input pin, the input foil is continuously scanned only in a small rectangular section around the position of the input pin that was previously identified. The scan time for scanning the section is correspondingly low, so that the input pin can be moved relatively fast without exceeding the edge region of the section in the scan time for the section. Identification of the momentary rectangular section can be very easily undertaken in the program control device because the address values corresponding to every identified picture element are available given the scan device of the invention.

Various methods are possible for the local modification of the reflectivity of the input foil by the input pin. In accordance with the invention, thus, a change in the reflectivity of the input foil can ensue by means of local pressure stressing of the input foil with the input pin. This can occur, for example, by disturbing the alignment of liquid crystals of a liquid crystal layer between two transparent cover layers of the input foil by local pressure stressing. The reflective behavior of the foil at this location also changes with local modification of the alignment of the liquid crystals. A further method for marking the position of the input pin on the input foil uses a colored fluid which is locally displaced from the region between two transparent cover layers of the input foil due to the local pressure stressing. Alternatively, the input foil can contain a temperature-sensitive dye layer, whereby the local modification of the reflectivity of the input foil ensues by locally heating input foil with the input pin. In this case, for example, a heating element which effects local heating of the input foil can be situated in the tip of the input pin. The input pin may alternatively be an electrode and the input foil may have a conductive layer serving as the cooperating electrode, so that the input foil is locally heated when the input pin is placed on the input foil, being locally heated by a current flux due to the contact resistance between the input pin and the input foil.

As a consequence of its flat design, the scan device can be used in the immediate area of the work station or, if the film is fashioned in pocket format, it can be used within a scan device in pocket format. The film can be reinforced by an additional thin plate or layer, which counteracts the flexibility of the film. Particularly in the use of the scan device in pocket format, the scan device can be augmented by a memory combined therewith to form a common component. The memory accepts image information of a defined plurality of originals. The film containing the actual scan device can thus be placed on an original at an arbitrary location, whereby larger originals can also be scanned in sections. In accordance with a further embodiment of the invention, the scan device can be augmented by a display combined therewith to form a single component, being thus augmented in order to visualize the stored image information. For example, this can be structurally undertaken such that the display surface of the display and the scan surface are formed by the two largest surfaces of a plate-shaped component. At the same time, this offers the advantage that the recorded image information can be immediately monitored after scanning a surface without changing the position of the scan device and, under given conditions, a more precise position of the scan device on the original to be scanned can be produced.

The scan device disclosed herein, however, also offers the possibility of providing a line connection to a system interface of a work station computer. This is particularly advantageous when the scan device in the form of a flat desk-top system since a multitude of images can thus be stored and can be in turn made visible as needed on, for example, a picture screen. A copying device, for example a telecopier, may be under the control of the work station computer and produce copies of the scanned originals. Necessary function commands (for example "copying") or auxiliary information (for example bibliographic data) can then be generated with the work station computer, these being stored in common with the image information and likewise being capable of being copied on paper. It is also possible, particularly when the scan device is designed in pocket format, that a key switch means for entering function commands and/or, auxiliary information to be stored in common with the image information are provided at a corresponding scan device. Particularly when the scan device as disclosed herein is included in a scan device in pocket format, the permanent connection to a system interface of a work station computer can be optionally or entirely replaced by a contacting device adapted to a corresponding counterpart of a data-processing means. With this contacting device, the scan device can be connected to a corresponding data-processing means, for example to a telecopier or to a work station computer, at any time.

Overall, the scan device disclosed herein offers a host of new use possibilities which, in particular, also exploit known devices and means of office communications.

DESCRIPTION OF THE DRAWINGS

FIG. 10 is a circuit diagram of a preferred embodiment of a scan device constructed in accordance with the principles of the present invention.

FIG. 11 is an embodiment of an original in the form of a keyboard foil.

FIG. 12 shows an input foil for graphic entry of curves in the scan device constructed in accordance with the principles of the present invention.

DESCRIPTION OF THE PREFERRED EMBODIMENTS

Figure 1:
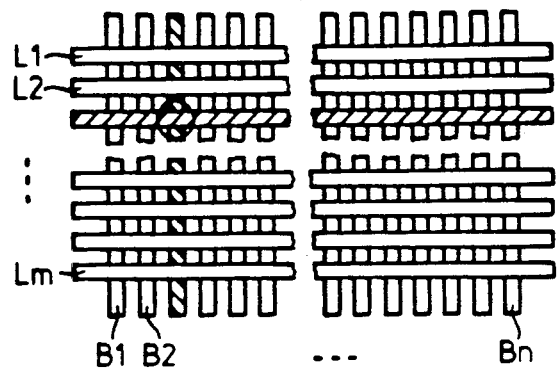
FIG. 1 is a plan view of a portion of the structure of a scan device including illumination elements and light-receiving elements constructed in accordance with the principles of the present invention.

FIG. 1 illustrates a grid structure formed of illumination elements B1 ... Bn and light-receiving elements L1 ... Lm. One plane of this grid structure is formed by the illumination elements B1 ... Bn and its other grid plane is formed by the light-receiving elements L1 ... Lm. The illumination elements B1 ... Bn are successively activated, this ensuing by the introduction of light into the end faces of the illumination elements B1 ... Bn or by the activation of electoluminescent lines respectively serving as one of the illumination elements B1 ... Bn. The illumination elements B1 ... Bn can also be individual, controllable light gate lines, rows or arrays, for example, liquid crystal lines, which are respectively successively driven from a light-blocking condition into a transparent condition, so that the light gate lines allow the light to pass line-by-line when they are illuminated. Each of the illumination elements B1 ... Bn is individually allocated to one microline of the original to be scanned, so that illumination of the original ensues line-by-line. This can occur by illuminating the full microline at the same time; however, exit regions of the illumination elements respectively allocated to a picture element of the microline can also be successively activated. At the intersections of the illumination elements B1 ... Bn with the light-receiving elements L1 ... Lm, the latter have entry regions which accept the light reflected from the original. Scanning thereby ensues progressing from light-receiving element to light-receiving element, whereby the light-receiving elements conduct the light picked-up to an evaluation means shared by all light-receiving elements L1 . . . Lm, or are themselves designed as individual light evaluation devices. Overall, there is a line-by-line illumination and column-by-column scanning of the original.

Figure 2:
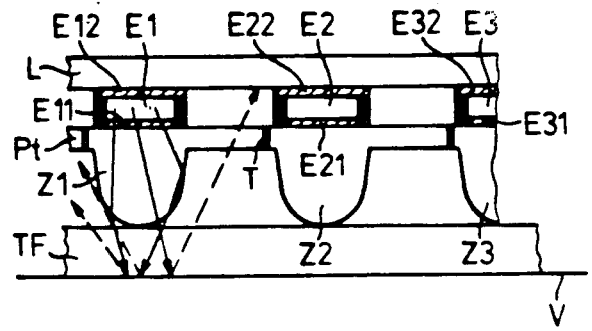
FIG. 2 is a side view of an embodiment of the illumination elements in the form of electro-luminescent lines.

FIG. 2 shows an exemplary embodiment for the format and the arrangement of the illumination elements. The illumination elements are respectively formed by electro-luminescent lines E1, E2, E3 or an electro-luminescent display, whereby each of the electro-luminescent lines E1, E2, E3 has a transparent electrode E11, E21, E31 facing an original V to be scanned and has an impermeable electrode E12, E22, E32 facing the adjoining light-receiving elements L. Respective cylindrical lenses Z1, Z2, Z3 are fashioned at the surface of a transparent plate Pt adjacent the transparent electrodes E11, E21, E31. The cylincrical lenses 21, 22, and 23 concentrate the light emitted by the electroluminescent lines E1, E2, E3 onto the individual picture elements. Reflecting dividers T between the individual cylinder lenses Z1, Z2, Z3 eliminate or diminish stray light from neighboring picture elements. The cylinder lenses Z1, Z2, Z3 are covered by a transparent film TF which defines the desired distance of the cylinder lenses Z1, Z2, Z3 from the original V.

Figure 3:
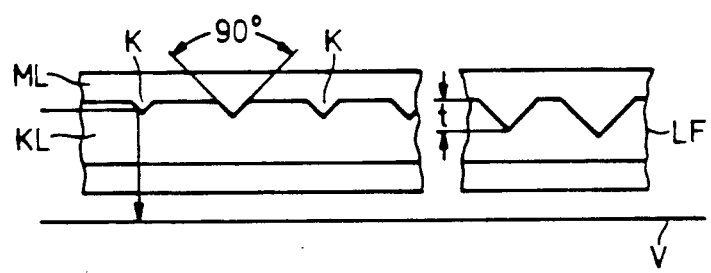
FIG. 3 is a side view of a light-conducting channel having exit regions constructed in accordance with the principles of the present invention.

In the exemplary embodiment of a light-conducting channel shown in FIG. 3, nn optical fiber LF constructed in a known manner of a core conductor KL and a cladding conductor ML, has in accordance with the invention notches K in the core conductor KL. The notches K are situated at that side of the core conductor KL facing away from an original V to be scanned and have a notch angle of at least approximately 90°. The light supplied into the optical fiber LF from the left by a light source (not shown) is deflected at the notch faces facing the light source and thus is incident on the boundary layer between core conductor KL and cladding conductor ML at an angle of approximately 90°. Passage of light through the cladding conductor ML is thus enabled. In order to compensate for the exponential drop of the radiation intensity along the optical fiber LF, the notch depth t increases along the optical fiber LF from that end (the left end) of the optical fiber LF facing the light source.

Figure 4:
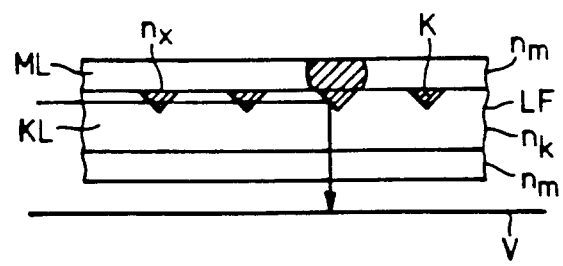
FIG. 4 is a side view of a further embodiment of a light-conducting channel with controlled decoupling of light therefrom constructed in accordance with the principles of the present invention.

FIG. 4 shows a schematic illustration of the principle of the actively controlled decoupling of light from an optical fiber. The optical fiber LF is again constructed in a known wey of a cladding conductor ML and a core conductor KL, whereby the material of the core conductor has a higher optical refractive index $n_k$ than that of the cladding conductor ML, $n_m$. A total internal reflection therefore occurs at the boundary layer between the core conductor KL and the cladding conductor ML. The refractive index $n_m$ of the cladding conductor ML can be varied by a sound wave progressing along the optical fiber LF. When the sound wave is fashioned as a so-called sound soli tone, a sound pulse having a short pulse width, a small region of a modified refractive index $n_m$ of the cladding conductor ML which progresses along the optical fiber LF arises.

The optical fiber LF is modified over that of FIG. 3 insofar as the notches K all have the same notch depth. Further, the space limited by the notch faces is filled with a material having a refractive index $n_x$ which is slightly higher than or of the same size as the refractive index $n_k$ of the core conductor KL. A sound wave pulse conducted along the optical fiber LF generates a reduction of the refract ve index $n_x$ or $n_k$ in the region between the notches K in succession along the notches K in its area of influence. Insofar as the width of the pulse is not dimensioned greater than the spacing between two notches K, light is decoupled from the optical fiber LF onto a picture element of the original V only in the region of one of the notches K.

Figure 5:
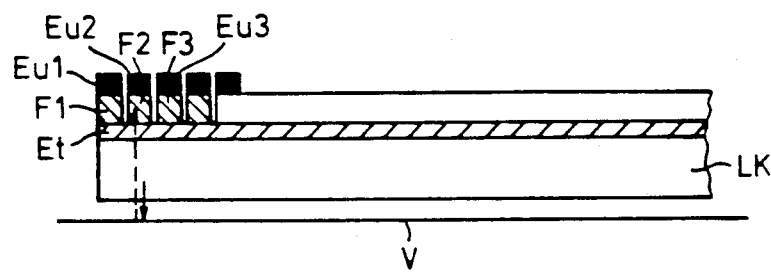
FIG. 5 is a side view of a further embodiment of a light-receiving element constructed in accordance with the principles of the present invention.

FIG. 5 shows an exemplary embodiment of a light pick-up device receiving light reflected from the original wherein the individual light-receiving elements are photo-conductor strips. A transparent electrode Et which is allocated in common to all photo-conductor strips F1, F2, F3 . . . and which covers all light-conducting channels LK is situated immediately at the surface of light-conducting channels LK which are supplied in the arrow direction by a light source (not shown). Each of the photo-conductor strips F1, F2, F3 has an individual, non-transparent electrode Eu1, Eu2, Eu3 which carries the charge current or photo-current to be evaluated. A light ray (see arrow) coupled out of the light-conducting channel LK is reflected by the original V and proceeds through the transparent electrode Et into the corresponding photo-conductor strips F1, F2, F3, etc. Modification of the photo-current caused thereby is acquired by a photo-conductor-strip-associated evaluation means (not shown). In the illustrated arrangement, at least one part of the light reflected by the original V proceeds through the associated light-conducting channel LK.

Figure 6:
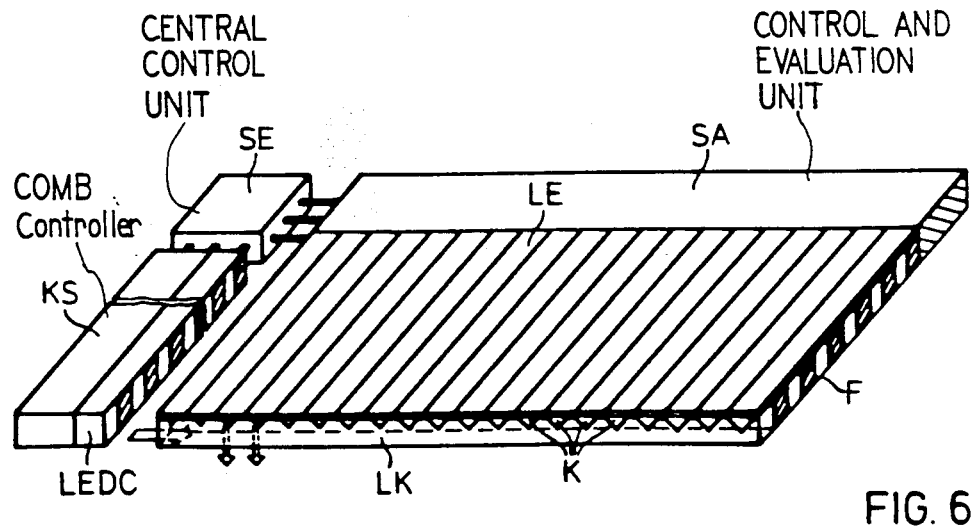
FIG. 6 is a schematic illustration in plan view of the overall structure of a scan device constructed in accordance with the principles of the present invention.

FIG. 6 shows a schematic illustration of an exemplary embodiment of a structural design for the scan device of the invention. A film F contains both light-conducting channels LK, whose number corresponds to the number of microlines to be scanned, and the system of light-receiving elements LE organized perpendiculary thereto, whose number is identical to the number of picture elements to be scanned along a line. Both the light-conducting channels LK and the light-receiving elements LE are shown in a rather coarse grid. The light-receiving elements LE are fashioned as photo-conductor strips and are connected to a control and evaluation means SA. A light-emitting diode comb LEDC is situated at an end face of the light-conducting channels LK; the light generated by the individual light-emitting diode cells is coupled into the light-conducting channels LK line-by-line by a comb controller KS. The light-conducting channels LK have notches K for decoupling light; the notch depth steadily decreases from the light-emitting diode comb LEDC along the light-conducting channels LK. The light conduction is illustrated by arrows.

The comb controller KS and the control and evaluation means SA are both under the control of a central control means SE. All components have the same thickness dimension as the film F so that a correspondingly larger film which, for example, can be placed on a desk as a flat system, is formed by joining the control and evaluation means SA, the control means SE, the light-emitting diode comb LEDC, the comb controller KS and the film F.

Figure 7:
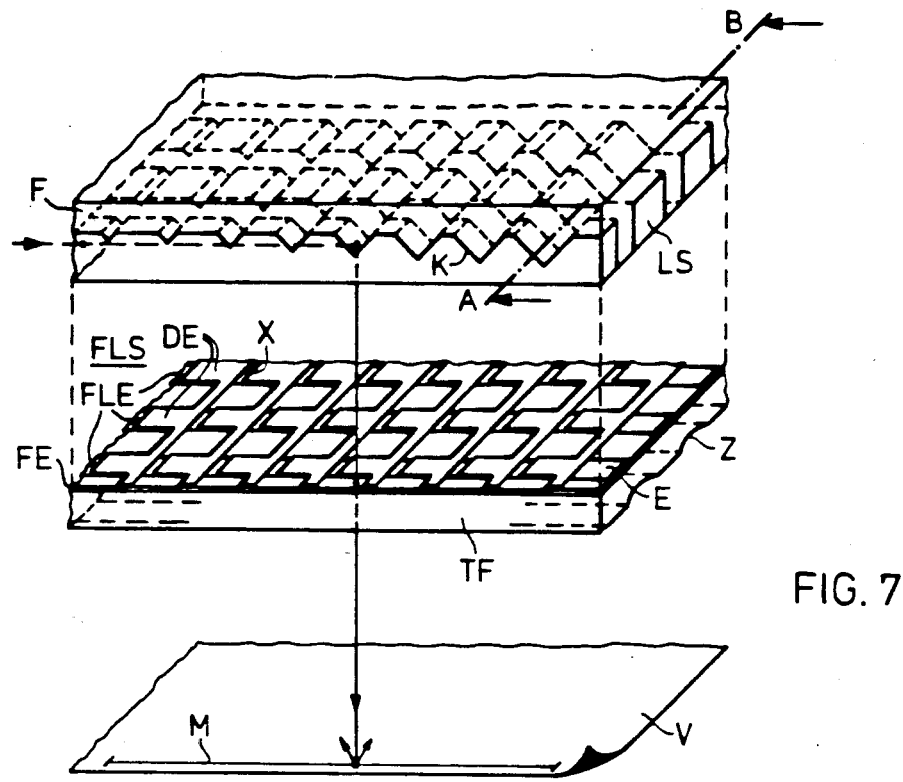
FIG. 7 is an exploded view of a preferred embodiment of a scan device constructed in accordance with the principles of the present invention.
Figure 8:
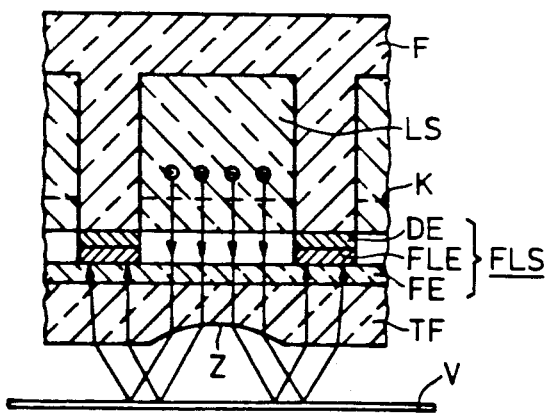
FIG. 8 is a detailed sectional view of a portion of the embodiment shown in FIG. 7.

FIG. 7 shows a portion of a preferred exemplary embodiment of the scan device. The sub-region of the scan device comprising the illumination elements is thereby shown separate from the sub-region containing the light-receiving elements only for the purpose of a clearer illustration. The two sub-regions, however, are in fact united to form a single film-like component as is shown in FIG. 8 in a section AB through a sub-region of the scan device shown in FIG. 7.

Light-conducting channels in the form of light-conductor rods LS lying parallel side-by-side in a transparent film F are embedded such that the light-conductor rods LS are respectively surrounded on three sides by the transparent film F. The respectively exposed sides of the light-conductor rods LS face an original V to be scanned. In a similar fashion to that shown in FIG. 3, the light-conductor rods LS have notches K at their sides facing away from the original, the notch depth of these notches increasing along the light-conductor rods LS from their ends facing a light source (not shown) in the left-hand area of the figure. The light supplied into the light-conductor rods LS by the light source is deflected at the notch faces facing the light source and is decoupled from the light-conductor rods LS roughly at an angle of 90° to the longitudinal axis of these light-conductor rods LS. Uniform decoupling of light along the individual light-conductor rods LS is achieved by the graduated depth of the notches K along the light-conductor rods LS and further measures which may become necessary such as, for example, modification of the transparency of those sides of the light-conductor rods LS facing the original along their longitudinal extent. The transparent film F has a lower optical refractive index in comparison to the light-conductor rods LS so that the light losses in the light-conductor rods as a consequence of total internal reflection at the boundary surfaces between the light-conductor rods LS and the film F are very low. The light-conductor rods LS can be realized in the film F in that, for example, grooves in the film F, i.e., scored or pressed into the film F, are filled out with transparent filler material. It is also possible to press a matrix of light-conductor rods LS and to cast the light-conductor rods LS into a film F with a casting compound. Light-receiving elements in the form of photo-conductor strips FLS are situated in the region of the sides of the light-conductor rods LS facing the original, perpendicular to the rods. The photo-conductor strips FLS each have a plurality of photo-conductor elements FLE which are situated in the longitudinal direction of the respective photo-conductor strip FLS in microline-associated intervals from one another, being thus situated in regions between two light-conductor rods LS. A manufacturing simplification results because photo-conductor elements FLE of all photo-conductor strips FLS disposed along a microline M are composed of a single line-shaped element E.

The individual photo-conductor elements FLE are applied to a common, transparent, original-proximate film electrode FE. At their sides facing away from the original, the photo-conductor elements FLE belonging to a photo-conductor strip FLS are connected to one another via a comb-shaped, light-impermeable cover electrode DE. In addition to the function of supplying the photo-current or a corresponding charge quantity to an evaluation means, the cover electrode DE also serves to prevent direct light incidence from the light-conductor rods LS to the photo-conductor elements FLE. For this reason, the photo-conductor elements FLE combined along a microline M to form a line-like element E are respectively opaquely covered in the regions X between the cover electrodes DE of neighboring photo-conductor strips FLS. The transparent film electrode FE is applied to a carrier film TF which is transparent as well and in which a strip-shaped lens Z is fashioned to improve the illumination and scanning of each and every picture element of the original V, as well as to avoid disturbing light influences between every light-conductor rod LS and the original V.

Figure 9:
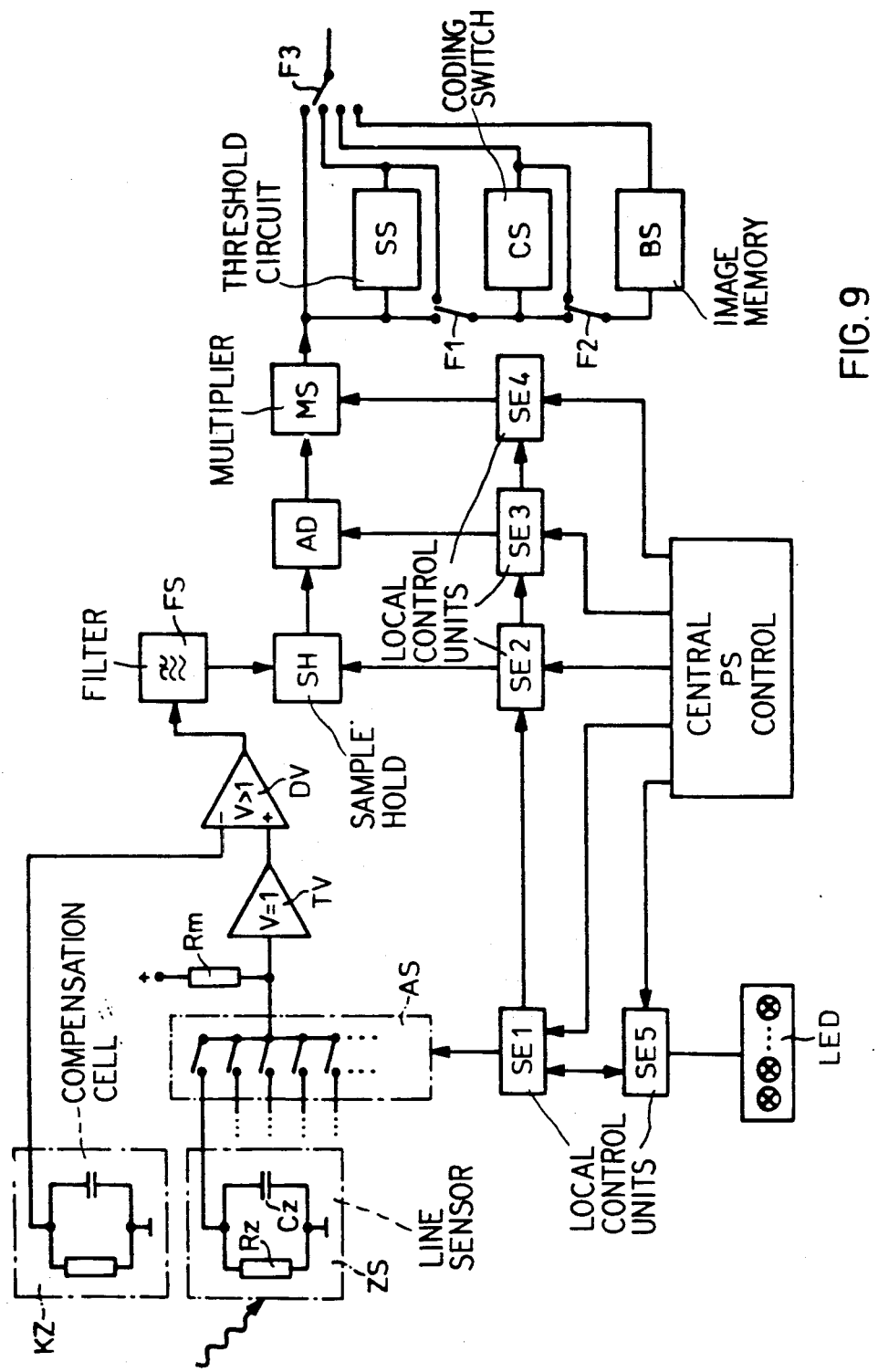
FIG. 9 is a schematic block diagram showing the control format for the scan device constructed in accordance with the principles of the present invention.

FIG. 9 illustrates an exemplary embodiment of a control structure for the scan device of the invention. It is assumed that a light-emitting diode comb LEDC having individually switchable cells, as shown in FIG. 6, is employed as the light source for the light-conducting channels. Light guides which transmit light to a line sensor ZS serve as light-receiving elements. The line sensor ZS, which is represented by an equivalent circuit of a resistor RZ and a capacitor CZ, has an analog switch stage AS allocated thereto. This analog switch stage AS has a plurality of switches corresponding in number to the plurality of individual cells of the line sensor ZS. The evaluation signals read out from the individual cells of the line sensor ZS are successively supplied via these switches as the potential across a precision resistor Rm connected to an isolating amplifier TV having a gain V=1. A following differential amplifier DV subtracts the dark signal of an unilluminated compensation cell KZ from the useful signal for temperature compensation. A following filter circuit FS separates high-frequency noise peaks from the useful signal. A subsequent sample-and-hold circuit SH samples the respective measured value which is then supplied to an analog-to-digital converter D which converts the analog, time-discrete amplitude information into eight-bitwide digital signals. 256 different brightness values can thus be represented. The following multiplier circuit MS corrects for differing intensity of illumination along a microline. The multiplier circuit MS can also be used to correct for different sensitivities of the line sensors ZS.

The multiplier circuit MS is followed by further switch devices such as a threshold circuit SS, a coding switch CS for potential redundancy reduction and an image information memory MS. Depending on the position of the function switches F1, F2 or of the output switch FS, differently edited output signals can be taken from the multiplier circuit MS.

The light-emitting diode comb LEDC, the analog switch AS, the sample-and-hold circuit SH, the analog-to-digital converter AD and the multiplier circuit MS are all under the control of local control devices SE1 . . . SE5 individually allocated to those components. These local control devices SE1 . . . SE5 are in turn controlled by a hierarchically higher-ranking program control unit PS which, for example, is realized by a single-chip microcomputer.

FIG. 10 shows a schematic circuit diagram of a preferred exemplary embodiment of the scan device of the invention. In the illustrated exemplary embodiment, the illumination elements are light-emitting diode lines LED situated line-by-line and the light-receiving elements are photo-conductor strips FLE situated column-by-column. The lines LED are connected to a demultiplexer DEMUX via a plurality of data outputs DA1, each data output DA1 being connected to a respective line LED. The demultiplexer DEMUX has an address input AE1 for addressing the data outputs DA1. In terms of function, the demultiplexer DEMUX therefore corresponds to the analog switch AS shown in FIG. 9. The photo-conductor strips FLE are connected to a multiplexer MUX having a plurality of data inputs DE2; every data input DE2 is connected to a respective photo-conductor strip FLE. The multiplexer MUX further has an address input AE2 for addressing the data inputs DE2 for through-connecting the signal pending at the respectively addressed data input DE2 to a data output DA2 of the multiplexer MUX. The address input AE1 of the demultiplexer DEMUX, as well as the address input AE2 of the multiplexer MUX, are respectively connected to an address output AA1 and to a further address output AA2 of an addressing unit ADR. The addressing unit ADR is connected at its input side to a program control unit PS in which the address values for the demultiplexer DEMUX and for the multiplexer MUX are calculated in a program execution. Depending on the use of the scan device, calculation of the address values ensues based on input values which are supplied to the program control unit PS via inputs PSE1, PSE2 and PSE3. The input PSE1 of the program control unit PS is connected via a data bus BUS to touch-sensitive sensor fields SF which are arranged in a column SP and in a row ZL at the edge of the scan surface formed by the line LED and the photo-conductor strips FLE. The sensor fields arranged in the column have a plurality of lines LED lying side-by-side respectively allocated to them, and the sensor fields SF arranged in the row ZL have a plurality of photo-conductor strips FLE lying side-by-side respectively allocated to them. The program control unit PS calculates the start and end address for controlling the lines LED by the demultiplexer DEMUX on the basis of the touched sensor fields SF along the column SP. Similarly, the start and end address for the selection of the photo-conductor strips FLE by the multiplexer means MUX are calculated from the touched sensor fields SF along the row ZL. A section within which optical scanning of an original ensues is defined in this way. Given the illustrated exemplary embodiment, the touched sensor fields SF are identified by shading and the picture elements BP of the section thus defined are marked. An input device, such as a keyboard T in the illustrated embodiment, is connected to a further input PSE2 of the program control unit PS for further definition of the addresses of picture elements to be scanned. An additional input PSE3 of the program control unit PS is connected to the output of an evaluator AWE which follows the data output DEA2 of the multiplexer MUX, and whose output forms the scan signal output A of the scan device. The evaluator AWE essentially contains the circuit elements shown in FIG. 9 for filtering and digitization of the scan signals pending at the output DA2 of the multiplexer MUX. The scan signals evaluated and digitized in the evaluator AWE are supplied via the input PSE3 to the program control unit PS so that the scan signals of the idividual picture elements are available therein together with the associated address values calculated by the program control means PS.

By way of example, FIG. 11 shows an original in the form of a keyboard foil wherein individual, marked, partially transparent key fields TF are fashioned. The keyboard foil is scanned by the scan device of the invention, whereby covered key fields are recognized by the program control unit PS on the basis of the modified optical samples. The respective, covered key field TF can be localized on the basis of the allocation of the address values to the respective samples and a corresponding key function in the program control means can be called in.

FIG. 12 shows an input foil EF whose reflectivity is locally variable by an input pin or pen ES and which enables employment of the scan device of the invention as a digitizer. The position of the input pin ES on the input foil EF is localized at the beginning by scanning the entire input foil EF. A rectangular section R1 is defined around the localized position, the coordinates of this section R1 being calculated in the program control means PS. This section R1 is repeatedly scanned at a high speed. When the input pin ES is moved, a new rectangular section R2 is defined around the newly identified position. The coordinates or addresses of the positions resulting from the moving input pin ES can be stored in a memory of the program control unit PS.

Although modifications and changes may be suggested by those skilled in the art, it is the intention of the inventors to embody within the patent warranted hereon all changes and modifications as reasonably and properly come within the scope of their contribution to the art.

We claim as our invention:

1. A device for microline-microline illumination and scanning of a planar original comprising:
   a plurality of spaced illuminatiuon elements each having longitudinal and transverse dimensions substantially corresponding to a microline;
   a plurality of spaced photo-conductor strips disposed perpendicularly to said microlines and corresponding in number to a desired number of picture elements along a microline to be scanned, each photo-conductive strip at least partially overlapping a microline;
   said illumination elements and said photo-conductive strips being respectively disposed in parallel planes in a common film; and
   means for coupling light from an illuminated microline to said photo-conductor strips at each overlap with said microline.

2. A device as claimed in claim 1 wherein said film is transparent.

3. A device as claimed in claim 1 for use with a light source, wherein said illumination elements are a plurality of light-conducting channels having end faces forming light inputs through which light from said light source enters said channels, each channel having a plurality of light exit ports along a length thereof in a channel wall for admitting light to illuminate said microline.

4. A device as claimed in claim 1 wherein each illumination element consists of two parallel side-by-side light-conducting channels, said parallel light-conducting channels having one end region having a mirrored surface for deflecting light emerging from one of said two light-conducting channels into the other of said light-conducting channels.

5. A device as claimed in claim 1 further comprising a strip-shaped lens disposed between each illumination element and said original.

6. A device as claimed in claim 1 wherein said photo-conductor strips are disposed closer to the original than said illumination elements.

7. A device as claimed in claim 1 wherein each of said photo-conductor strips has a plurality of photo-conductor elements disposed on a common transparent film electrode in a longitudinal direction of said photo-conductor strips, said photo-conductor elements being disposed on said electrode at microline intervals from each other, and further comprising a comb-like opaque cover electrode connecting said photo-conductor elements in a strip.

8. A device as claimed in claim 1 wherein each photo-conductor strip consists of at least two sub-strips disposed one after the other in a longitudinal direction of said photo-conductor strip, said illumination elements each crossing a plurality of different sub-strips of a photo-conductor strip, and further comprising means for simultaneously selecting a plurality of said illumination elements corresponding in number to the number of sub-strips.

9. A device as claimed in claim 1 further comprising:
a demultiplexer having a plurality of data outputs respectively connected to said illumination elements, and having an address input;
a multiplexer having a plurality of data inputs respectively connected to said light-receiving elements, a data input, and a data output at which electrical scanned signals are present Corresponding to scanned picture elements;
an address unit having an input, and address outputs respectively connected to said address inputs of said demultiplexer and said multiplexer; and
a control unit having a signal output connected to said input of said address unit for controlling scanning of said original by selectively controlling activation of said illumination elements through said address unit and said demultiplexer and selectively controlling read-out of data from said light-receiving elements through said address unit and said multiplexer.

10. A device as claimed in claim 1 further comprising a memory connected to said light-receiving elements for storing data received therefrom based on illumination of said original.

11. A device as claimed in claim 1 further comprising a work station computer connected to said light-receiving elements for receiving data therefrom.

12. A device as claimed in claim 1 further comprising means for entering selected function commands and auxiliary information for use in common with data from said light-receiving elements.

13. A device as claimed in claim 1 wherein said film is designed in pocket format.

14. A device as claimed in claim 3 wherein said light-conducting channels are light-conducting rods carried in said film.

15. A device as claimed in claim 3 wherein said exit ports of said light-conducting channels have a transparency which increases along said light-conducting channels from that end of said light-conducting channels having said light input facing said light source.

16. A device as claimed in claim 3 wherein said exit ports of said light-conducting channels have individual cross sections which increase along a length of said light-conducting channels from that end of said channels facing said light source.

17. A device as claimed in claim 3 wherein said light-conducting channels have respective opposite end faces from said input face, said opposite end faces being mirrored.

18. A device as claimed in claim 3 wherein each light-conducting channel has an opposite end face, and wherein said light source is coupled into both of said end faces of said light-conducting channels.

19. A device as claimed in claim 3 wherein said light-conducting channels each have a plurality of V-shaped notches disposed at respective sides thereof facing away from said original, said notches being disposed in the region of every picture element along a microline, said notches being disposed perpendicularly with respect to a longitudinal direction of said light-conducting channel and having faces each inclined at an angle of at least 45° relative to said longitudinal axis of said light-conducting channel.

20. A device as claimed in claim 3 wherein said light-conducting channels each have a side facing said original and a side facing away from said original, and wherein the distance between said sides decreases along the light-conducting channels from said end face thereof receiving light from said light source.

21. A device as claimed in claim 3 further comprising means for simultaneously activating all of said light exit ports of each light-conducting channel by locally cancelling the total internal reflection, said means for simultaneously activating said light-exit ports being coextensive with the length of each light-conducting channel and progressing activation from channel to channel.

22. A device as claimed in claim 3 further comprising a light gate chain disposed for receiving light from said light source, said light gate chain having a plurality of switchable outputs respectively allocated to said light-conducting channel.

23. A device as claimed in claim 3 wherein said light source is a light-emitting diode line.

24. A device as claimed in claim 14 wherein said light-conductor rods are embedded in said film and are surrounded by said film at three sides thereof.

25. A device as claimed in claim 24 wherein said film consists of a material having a lower optical refractive index than the optical refractive index of said light-conductor rods.

26. A device as claimed in claim 24 wherein said film is mirrored at least in regions thereof surrounding said light-conductor rods.

27. A device as claimed in claim 24 wherein said film has a plurality of grooves therein, and wherein said light-conductor rods consist of transparent filler material disposed in said grooves.

28. A device as claimed in claim 26 wherein said film consists of a casting material for said light-conductor rods.

29. A device as claimed in claim 19 wherein the notch depth of said notches in each light-conducting channel increases with increasing distance of said notches from said end face of said channel facing said light source.

30. A device as claimed in claim 19 wherein said notches are respectively filled with material having a lower refractive index than the refractive index of said light-conducting channel.

31. A device as claimed in claim 21 wherein said means for simultaneously activating said light-exit ports is a sound generator, and wherein said film has at least one end face parallel to said light-conducting channels, and said film further has a region adjacent to said end face excitable by said sound generator.

32. A device as claimed in claim 22 wherein said light gate chain includes at least one light guide having a plurality of light exit ports disposed opposite said end faces of said light-conducting channels, and means for activating said light exit ports of said light guides by locally cancelling the total internal reflection successively along said light guide.

33. A device as claimed in claim 32 wherein said light guide is a structure identical to said light-conducting channels.

34. A device as claimed in claim 23 wherein said light-emitting diode line consists of a plurality of light-emitting diodes corresponding in number to the number of light-conducting channels, and further comprising means for individually switching each light-emitting diode in said line.

35. A device as claimed in claim 5 wherein said strip-shaped lens is disposed on a surface of said film facing said original.

36. A device as claimed in claim 7 wherein said photo-conductor elements are formed by a continuous photo-conductor strip having a plurality of opaque regions dividing said strip into said photo-conductor elements.

37. A device as claimed in claim 9 further comprising an evaluation unit connected to said data output of said multiplexer having an output forming a signal output of said device, said output of said evaluation unit also being connected to a feedback input of said control unit.

38. A device as claimed in claim 9 further comprising:
a plurality of touch-sensitive sensor fields disposed at edge regions of said film in a column and in a row, said plurality of illumination elements being divided into groups of adjacent illumination elements, said illumination elements in each group being connected to a respective sensor field in a column, and said plurality of light-receiving elements being divided into a plurality of groups of adjacent light-receiving elements, said light-receiving elements in said groups being connected to respective sensor fields in said row, said sensor fields in said rows and columns being additionally connected to further data inputs of said program control unit, said program control unit controlling activation of said data outputs of said demultiplexer and said data inputs of said multiplexer through said address unit based on signals received from a touched sensor field by designating a start address and an end address for said demultiplexer and multiplexer.

39. A device as claimed in claim 9 for use with an electronic memory for manually selecting memory locations of said electronic memory, wherein said original is a keyboard foil, and further comprising:
a plurality of marked key fields on said keyboard foil consisting of partially transparent regions of said foil; and
means for supplying signals from light-receiving elements disposed beneath a manually-covered key field to said control unit, said control unit converting said signals into address information for said multiplexer for selecting a memory location corresponding to the covered key field.

40. A device as claimed in claim 9 wherein said original is an input foil, and for use with an input pin, and wherein said program control unit initially scans the entire input foil by activating all data outputs of said demultiplexer and all data inputs of said multiplexer, placement of said input pin causing a change in the light supplied to said light-receiving elements in the region of said input pin, said program control unit continuously scanning a rectangular section of selected size around said input pin location and recalculating the position of said rectangular section after each scanning thereof.

41. A device as claimed in claim 40 further comprising means for changing the reflectivity of said foil by local pressure application to said foil by said input pin.

42. A device as claimed in claim 41 wherein said means for changing the reflectivity of said foil is a liquid crystal layer disposed between two transparent cover layers of said foil.

43. A device as claimed in claim 41 wherein said means for changing the reflectivity of said foil is a colored liquid disposed between two transparent cover layers of said foil displaceable by said local pressure application by said input pin.

44. A device as claimed in claim 41 wherein said means for changing the reflectivity of said input foil is a temperature-sensitive dye layer disposed in said foil, and wherein said input pin locally elevates the temperature of said dye layer.

* * * * *